March 30, 1954
C. R. SKINNER
2,673,536
ONION PLANTER
Filed Aug. 28, 1951
2 Sheets-Sheet 1
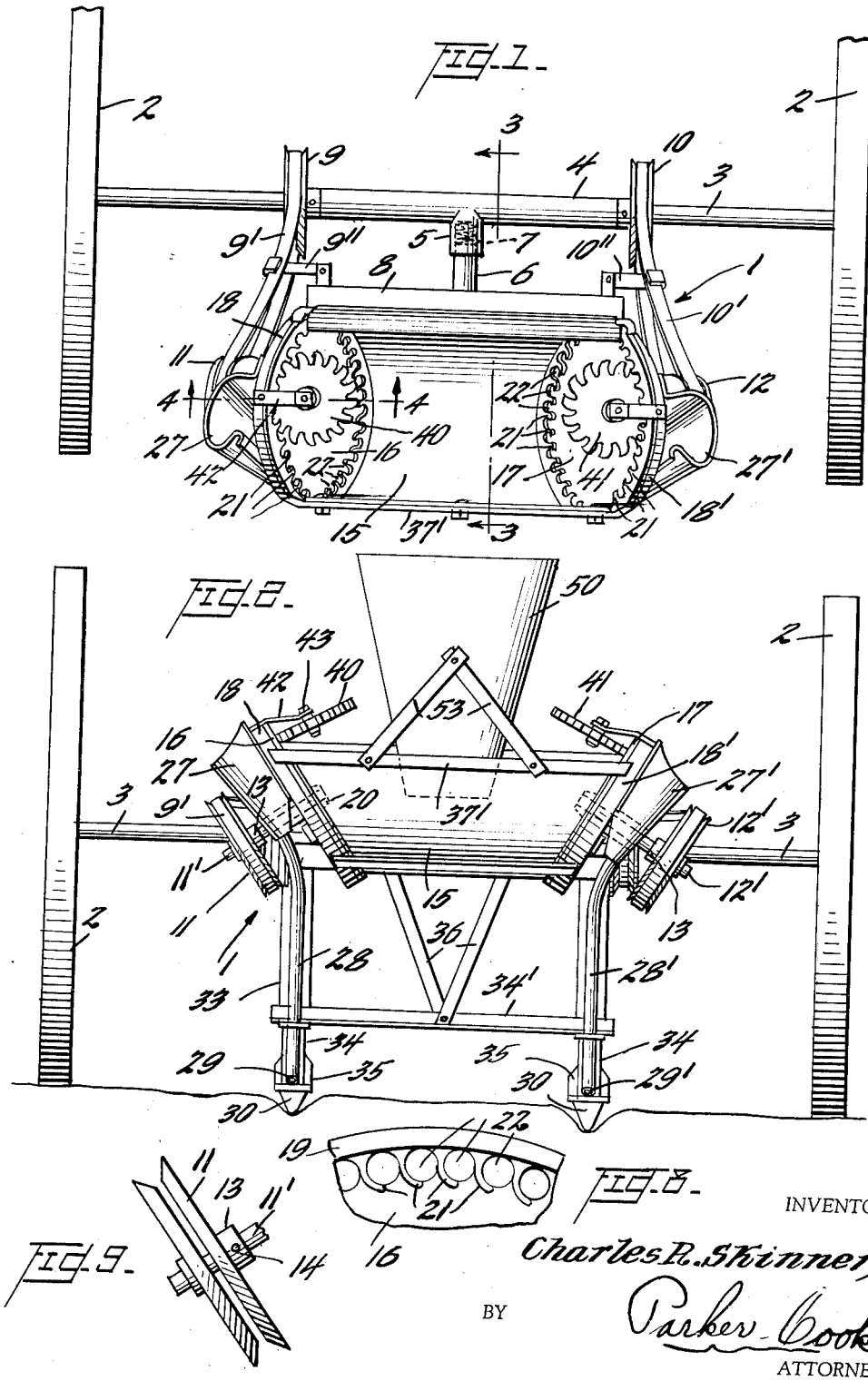
INVENTOR
Charles R. Skinner,
BY Parker Cook.
ATTORNEY March 30, 1954  C. R. SKINNER  2,673,536
ONION PLANTER
Filed Aug. 28, 1951  2 Sheets-Sheet 2
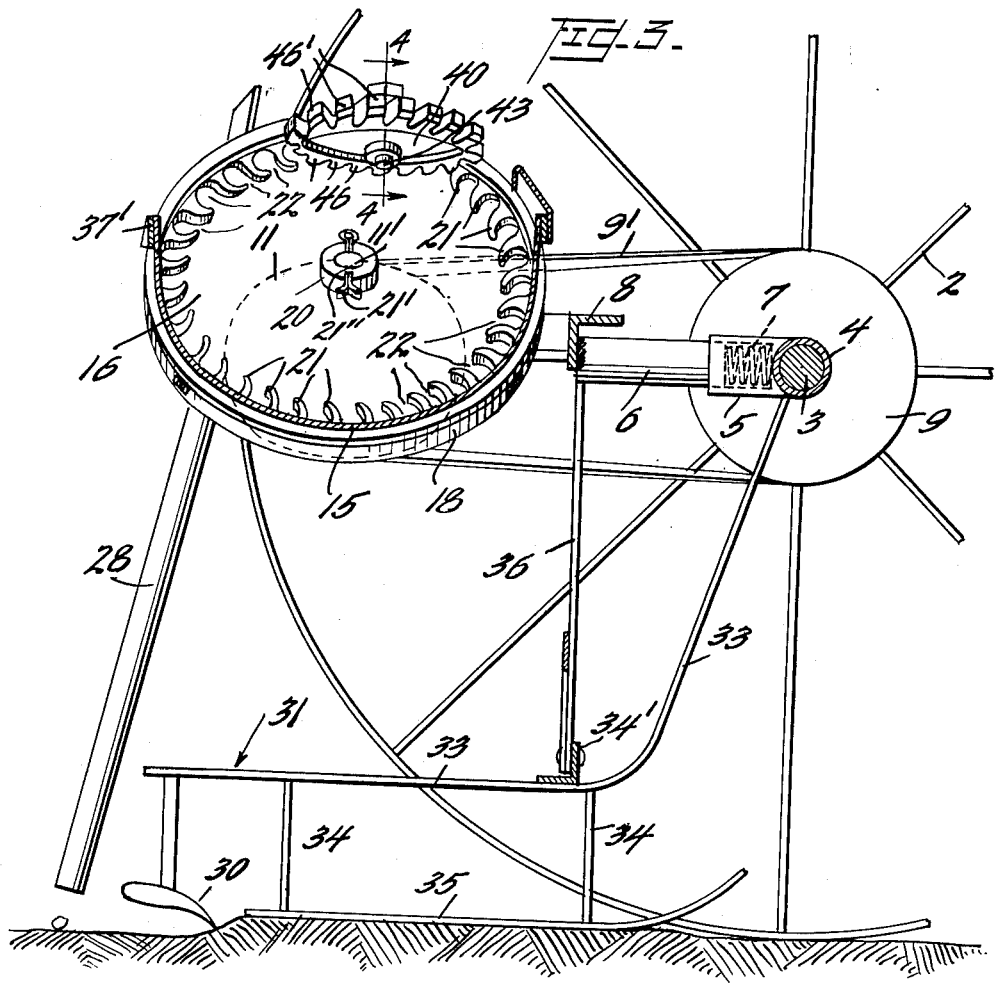
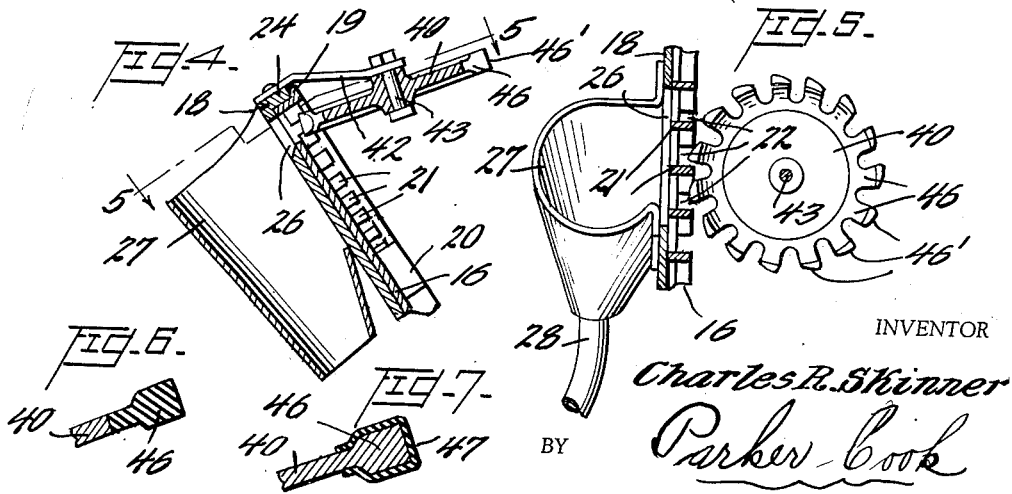
INVENTOR
Charles R. Skinner
BY Parker Cook
ATTORNEY Patented Mar. 30, 1954

2,673,536

UNITED STATES PATENT OFFICE 2,673,536

ONION PLANTER

Charles R. Skinner, Newfield, N. J.

Application August 28, 1951, Serial No. 243,966

1 Claim. (Cl. 111—63)

My invention relates to new and useful improvements in onion planters and more particularly to an onion planter that is to be towed or pulled by a tractor.

One of the objects of the present invention is to provide an onion planter wherein the seed onions are placed in a hopper in which there are two pickup wheels, one at each end of the hopper, and each wheel in turn has associated therewith what might be termed a pusher wheel to assure a seed onion being forced through the pickup wheel and end plate to be dropped in a furrow at a certain position in the rotation of the pickup wheel.

It is desirable that the seed onions be planted in spaced relation about four inches apart, and it is also desirable that as the machine travels, every four inches in a furrow will have a seed onion deposited.

Still another object of the invention is to provide a seed onion planter wherein the seed onions are not mashed or in any way crushed or bruised, but will be gently picked up by the pickup wheels and then forced through certain openings, so that they may drop by gravity to the furrows in which they are to be seeded or planted.

Still another object of the invention is to provide an onion planter that is relatively simple in construction and having but few parts, the pickup wheels being driven from the supporting wheels of the onion planter, and the pusher wheels in turn being driven by inter-meshing with the fingers of the pickup wheels.

With these and other objects in view, the invention consists in certain new and novel arrangements and combinations of parts as will be hereinafter more fully described and pointed out in the claim.

Referring now to the drawings, showing a preferred embodiment,

Fig. 1 is a top plan view of my improved onion seed planter,

Fig. 2 is a rear elevation, with a hopper in place,

Fig. 3 is an enlarged section taken on line 3—3 of Fig. 1, looking in the direction of the arrows, Fig. 4 is an enlarged sectional view taken on line 4—4 of Fig. 1, Fig. 5 is a sectional view taken on line 5—5 of Fig. 4, Fig. 6 is a fragmentary detailed section of one of the teeth of the pusher wheel, Fig. 7 is a slightly modified form showing an enlarged section of a rubber covered tooth, Fig. 8 is a detailed view of a portion of the pickup wheel, and Fig. 9 is a detail of one of the adjustable split pulleys for driving a pickup wheel.

Referring now more particularly to the several views, and to Fig. 1, there is shown the onion planter 1 having the supporting wheels 2 which are rigidly mounted on the main axle or shaft 3, there being a central sleeve 4 mounted on this aforementioned axle 3. In this sleeve 4 there may be seen the T 5 and the interfitting piece of tubing 6 in which is mounted a spring (see Fig. 3) to force the tubing 6 against a cross-bar 8 of the hopper to be mentioned.

There also may be seen like driving pulleys 9 and 10 mounted on the main axle 3, and from these respective pulleys 9 and 10 extend the V-shape driving belts 9' and 10' which fit over the split pulleys 11 and 12. Also, there may be seen (Fig. 1) the belt guides 9" and 10", as these belts 9 and 10 do not travel in a straight line.

It might also be mentioned that one end of the tube 6 aforementioned is welded to the cross-bar 8, which in turn is welded to the end plates or casings of the hopper, to be hereafter mentioned.

The split pulleys or driving wheels 11 and 12 are respectively mounted on stub axles 11' and 12', and a description of the one split pulley will be a description of both.

There also may be seen a collar 13 on the stub axle 11', held by the set screw 14. This is so the split pulley 11 may be varied slightly in width to decrease or increase the diameter to thus regulate, within certain limits, the rate of rotation of the split pulley 11 being driven by the V-shape driving belt 9'.

The hopper 15 is substantially U-shaped, made of metal, and is cut away on its opposite ends at a sharp angle, substantially 45°; and one end is sealed with an end plate or casing 18, and the other end is sealed with an end plate or casing 18', in each of which end plates or casings 18 and 18' are mounted respectively pickup wheels 16 and 17. There is a cross bar 37' extending along the upper edge of the hopper for strengthening the same and forming a support for braces and a super-hopper, as will be mentioned later.

Inasmuch as the pickup wheels 16 and 17 are identical, a description of one is a description of both. This pickup wheel or disk 16 rotatably fits within the aforementioned end plate 18, which plate 18 has an upstanding rim 24 about coextensive in height with a rim 19 on the pickup wheel 16; and this pickup wheel 16 has a plurality of curved fingers 21 with circular apertures 22 between the respective fingers 21.

This pickup wheel 16 also has an integral central slotted hub 20 (see Fig. 3) which is rigidly secured to the stub axle 11' by the cotter key 21' which is passed through an aperture 21'' in the stub axle 11'. The other pickup wheel 17 is similarly arranged.

Thus, when the planter 1 is drawn by a tractor (not shown), the rotation of the main shaft 3 through the aforementioned driving belts 9' and 10' drives the split pulleys 11 and 12 and in turn rotates these pickup wheels 16 and 17.

The end plate 18 also has an opening 26 near the upper part of its circumference and directly in alignment with the circumferentially mounted fingers 21 and their openings 22, so that as the seed onions are carried to the upper end of their travel in the pickup wheel 16 they will drop or rather be forced through an opening 22 in the pickup wheel 16 and through the opening 26 in the end plate 18 into a small funnel 27, where they will drop by gravity through the tube 28 and out through the end 29 into a plowed furrow, as will be mentioned shortly.

The funnel 27 is also welded or otherwise secured to the end plate, as may be seen in Figs. 1, 2 and 5. The arrangement at the opposite side of the planter 1 is identical, there being the funnel 27', the tube 28'. Thus, the seeder plants in two rows at one and the same time.

It might also be mentioned here that forming a part of the onion planter is a sled 31, which acts to support the hopper 15 and its component parts, as well as carry plows 30 and for digging the furrows in which the onions are to be planted.

As may be seen in Figs. 2 and 3, there are a pair of metal arms 33 that are secured at their upper end to the sleeve 4, and then extend downwardly and rearwardly. From these arms 33 depend the verticals 34 which are secured respectively to the sled runners 35. These runners 35 tend to pack the earth directly in front of the plows 30, which are also hung from the aforementioned sled 31. Thus, when the onion planter is towed behind the tractor, the dirt directly in front of the plows 30 is first pressed down by the weight of the sled and hopper and its parts, and then the furrow is turned by the following plows 30.

There are also means for covering the furrow directly behind the dropped onions, but this forms no material part of the invention and is not shown.

As also may be seen in Figs. 2 and 3, there is a cross-brace 34' secured to the upper portion of the sled 31, and from this cross-brace 34' extends the V-brace 36 which V-brace 36 is riveted to the cross-bar 8 which, as stated, is welded to the end plates or casings 18 and 18'.

Now, to assure that the seeded onions carried in the hopper 15 will be discharged continually and with no chance of failure, I provide a pusher wheel 40 for the one end of the hopper 15 and a like pusher wheel 41 for the other end of the hopper 15. Inasmuch as the pusher wheels 40 and 41 are identical, just one will be described.

Glancing at Fig. 1, there will be seen a short arm 42 secured to the rim 24 which extends inwardly and over the pickup wheel 16. Mounted on the end of this arm 42 is a stub shaft 43 that supports the pusher wheel 40 at right angles to the pickup wheel 16. This pusher wheel 40 may also be seen more in detail in Fig. 5, and is provided with a series of teeth 46 which are flattened on their front faces 46'. These teeth 46 mesh with the curved fingers 21 on the pickup wheel 16 so that as the pickup wheel 16 revolves it will also cause the pusher wheel 40 to rotate, tooth by tooth, and the flattened outer surfaces 46' of the teeth 46, extending part-way through the openings 22, will cause the seed onions carried by the respective fingers 21 of the pickup wheel 16 to be pushed through the respective openings 22 in the pickup wheel 16 when these openings 22 are opposite or in registry with the aforementioned opening 26 in the end plate or casing 18.

Therefore, if a seed onion does not fall by gravity through the end plate 18, which it will be remembered is set at about an angle of 45° from the vertical, the pusher wheel 40 meshing with these fingers 21 of the pickup wheel 16 will force the successive seed onions through the openings 22 in the pickup wheel 16 and through the large opening 26 in the end plate or casing 18, so that the onions will drop into the respective hoppers 27 and 27', and out directly behind the aforementioned plows 30, after which the furrows will be covered by parts not shown.

A super-hopper 50 is shown in Fig. 2, held by the braces 53 that are also soldered to the cross-bar 37' on the upper edge of the hopper 15, so that if the rows are so long that the hopper 15 will be empty by the time it reaches the end of the row, the main hopper 15 may be filled up and also the super-hopper 50.

By having these pickup wheels 16 and 17 at an angle of substantially 45° from the vertical, there is less likelihood of the seed onions slipping from their place between the curved fingers 21; and also there is a reduced area at the bottom of the hopper 15, so that the onions will be properly fed even if the hopper 15 is nearly empty.

I have found that it is very essential that the teeth 46 of the pusher wheel 40 either be covered with a soft rubber covering 47, as shown in Fig. 7, or that the teeth 46 themselves may be made of a rubber bonded to the metal of the pusher wheel 40.

In other words, if just the metal teeth are forced against the onion seeds, they may at times have a tendency to crush them; whereas if the teeth are either rubber covered or integral rubber teeth, there is no likelihood of the onion seeds being crushed.

The size of the split pulleys 11 and 12 and the size of the driving wheels 9 and 10 on the main shaft 3 determine the rotative speed of the pickup wheels 16 and 17 and the distance between the dropped onions; but for a finer adjustment, as heretofore mentioned, the split pulleys 11 and 12 may be opened or closed to increase or decrease their diameter so that a finer adjustment may be made without substituting larger or smaller pulleys.

From the foregoing, it will be seen that I have provided an onion seed planter that is relatively light in weight and consists of but few parts, and efficient in that there is little or no likelihood of any onion not passing through the end plate 18 when engaged by a tooth 46 of the pusher wheel 40, and the same being true for the other end of the hopper.

Many slight changes might be made without departing from the spirit and scope of the invention.

Having thus described my invention, what I claim is new and desire to secure by Letters Patent is:

In an onion planter an axle, a pair of wheels rigidly secured thereto, an elongated hopper for the onions, a sled provided with runners secured to the axle for supporting said hopper and pressing down the earth, casings forming the ends of said hopper, said casings each positioned at substantially 45° from the vertical, pickup wheels in said casings positioned at the same angle, having curved fingers around and within the rims, the pickup wheels provided with apertures between the fingers; each of the aforementioned casings having an aperture near its upper portion; a pusher wheel associated with each pickup wheel and having slightly compressible teeth intermeshing with the fingers of the pickup wheel and extending into said apertures; micro-adjustable driving means connected with the axle for rotating the pickup wheels; a small funnel located behind the respective openings in the end casings; plows carried by the sled and directly behind said runners for forming furrows; and a discharge tube leading from each last mentioned funnel to just behind the plows, whereby rotation of the pickup wheels and the pusher wheels will force the said onions carried upwardly by the said fingers into the small funnels and drop them directly behind the said plows into said furrows.

CHARLES R. SKINNER.

References Cited in the file of this patent

UNITED STATES PATENTS

| Number | Name | Date |
|---|---|---|
| 58,988 | Cox | Oct. 23, 1866 |
| 139,074 | Matthews | May 20, 1873 |
| 140,493 | Fulghum et al. | July 1, 1873 |
| 175,065 | Garrett | Mar. 21, 1876 |
| 193,883 | Mack | Aug. 7, 1877 |
| 514,522 | Tucker | Feb. 13, 1894 |
| 540,458 | Robbins | June 4, 1895 |
| 590,621 | Myers | Sept. 28, 1897 |
| 618,136 | Schofield | Jan. 24, 1899 |
| 633,840 | Heaphy | Sept. 26, 1899 |
| 660,599 | Svensen | Oct. 30, 1900 |
| 736,981 | Kohser | Aug. 25, 1903 |
| 1,220,684 | Ray | Mar. 27, 1917 |
| 1,330,911 | Short | Feb. 17, 1920 |
| 1,371,441 | Ruszczak | Mar. 15, 1921 |
| 1,453,923 | De Young | May 1, 1923 |
| 1,719,912 | Troxel | May 14, 1929 |
| 2,054,552 | Wakeham | Sept. 15, 1936 |
| 2,062,629 | Zimic | Dec. 1, 1936 |